April 27, 1965 L. R. BROWN 3,181,122

PHASE CODE DETECTING SYSTEMS HAVING PHASE-LOCKED LOOPS

Filed Oct. 2, 1961

Lloyd R. Brown
INVENTOR.

BY Michael P. Breston

AGENT 3,181,122

PHASE CODE DETECTING SYSTEMS HAVING PHASE-LOCKED LOOPS

Lloyd R. Brown, Sarasota, Fla., assignor to Electro-Mechanical Research Inc., Sarasota, Fla., a corporation of Connecticut Filed Oct. 2, 1961, Ser. No. 142,057
13 Claims. (Cl. 340—170)

Figures 1, 2:
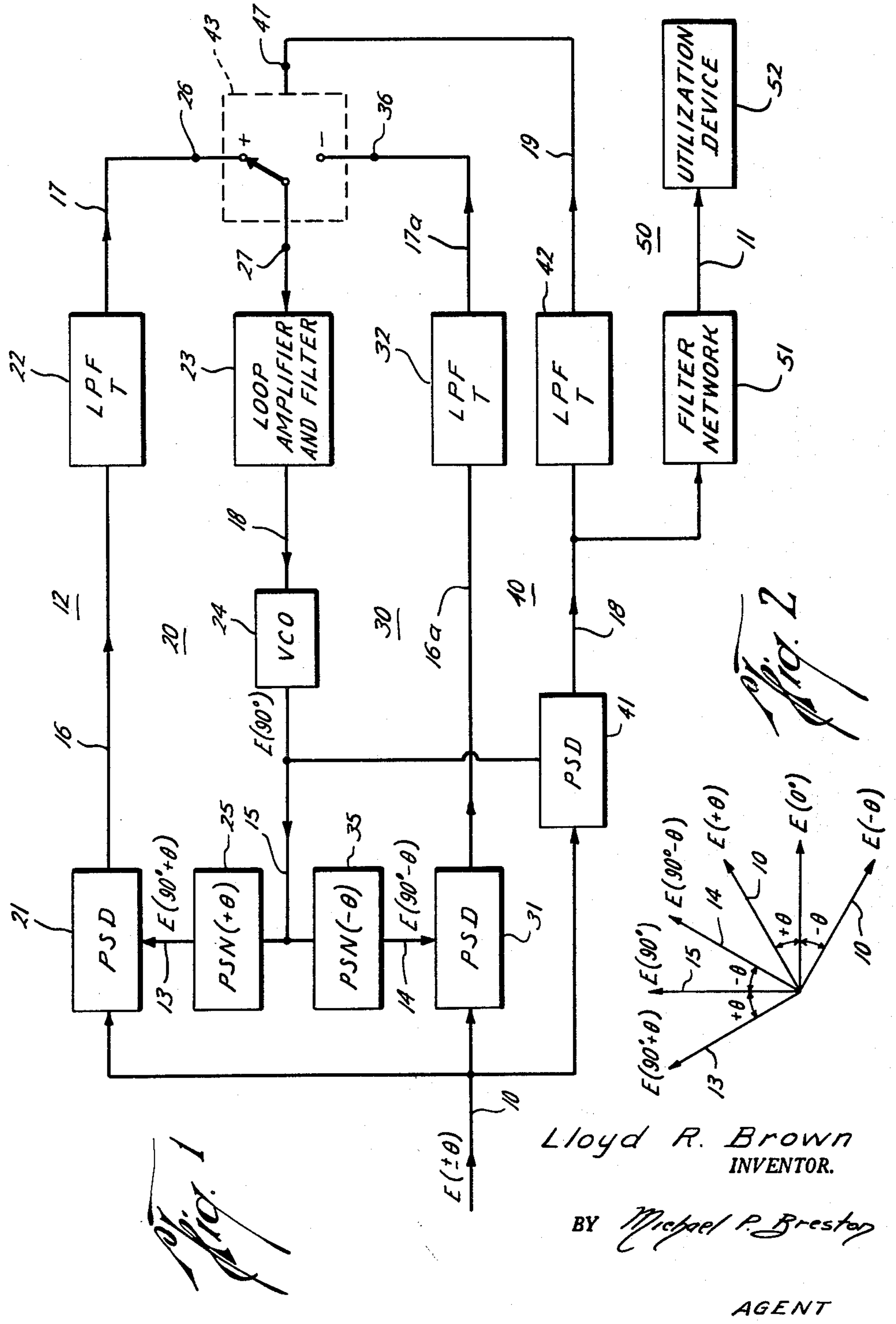

This invention relates generally to phase-code detecting systems and more particularly to detecting systems employing phase-locked loops for detecting phase-coded signals.

In many applications, for example in telemetry, it is often more convenient to transmit intelligence in digital rather than in analog form. In such applications, phase-modulation (PM) is employed increasingly. Although higher level digital codes are known and may be utilized, in practice, however, the information is generally conveyed in the bi-level or binary code. A typical binary PM wave may consist of a series of signals of constant phase but of opposite polarity (plus-minus signals). Each signal thus forms a binary digit, or bit. Conventionally, the plus and minus signals are termed respectively the "1" and "0" bits. The relative positions of the "1's" and the "0's" in the coded wave depend upon the corresponding values of the encoded information. Using vector, or phasor, nomenclature, the plus and minus signals may be denoted respectively by $E(+\theta)$ and $E(-\theta)$, both signals being referenced with respect to a zero-phase signal $E(0°)$. In sum, a binary PM wave includes a series of $E(+\theta)$ signals, the sequence of which determines the transmitted encoded intelligence.

Because of low power transmission, ever increasing transmission distances, severe environmental conditions, etc., the transmitted PM wave becomes greatly distorted. The distortion or noise, gives rise to an appreciable noise-to-signal ratio and, consequently, to the need for a dependable and accurate PM detector. To transform a distorted binary PM wave into a distortionless binary amplitude-modulated (AM) wave for use, for example, by a digital computer, required in past efforts costly complex networks which tended to reduce the overall reliability of the PM detector. This transformation can be best accomplished by generating within the detector a reference, or standard, signal for use in deciding whether the incoming bit is a binary "1" or a binary "0." To that end, phase-locked loops can be employed advantageously because of their ability when properly utilized to generate the reference signal and to greatly enhance the detector's signal-to-noise performance.

Accordingly, it is a general object of this invention to provide new and improved PM detectors which employ especially arranged phase-locked loops.

It is another object of this invention to provide new and improved phase-locked loop detectors capable to provide a standard signal and to accurately detect highly distorted coded PM waves.

It is a further object of this invention to provide new and improved phase-locked loop detectors of the foregoing type which require a minimum of networks thereby affording economy of operation.

These and other apparent objects are attained in accordance with this invention by employing phase-locked loops to synchronize the phase of a reference signal produced by a local signal generator with the phase of the incoming coded PM wave and, by utilizing a phase comparator to compare the phase of the incoming signals with the phase of the reference signal and to provide an output signal having a parameter which changes states in correspondence with the changes in the phase of the incoming wave.

The foregoing and other objects and advantages of the invention will appear more fully hereinafter from a consideration of the detailed description which follows, taken in conjunction with the accompanying drawing wherein one embodiment of the invention is illustrated. It is to be expressly understood, however, that the drawing is for the purpose of illustration and description only, and is not to be construed as defining the limits of the invention.

FIG. 1 is a block diagram of a PM detector in accordance with a preferred embodiment of the invention; and FIG. 2 is a vector diagram helpful in explaining the operation of the PM detector.

Referring now to the figures, the incoming binary PM wave may arrive on line 10 from the output of a telemetry receiver, a magnetic playback unit, a PM discriminator, etc. To facilitate the description of the invention, it will be assumed that the waveforms of the incoming signals are sinusoidal. Hence, the binary PM wave will consist of a series of $$E \sin(\omega t+\theta)=E(\theta) \text{ and } E \sin(\omega t-\theta)=E(-\theta)$$

signals where: $E \sin(\omega t)=E$ is the "carrier" signal, E is the signals' maximum amplitude, $\omega$ is the angular frequency in radians-per-second, $t$ is time in seconds, $(+\theta)$ is the phase angle in radians corresponding arbitrarily to a binary "1," and $(-\theta)$ is the phase angle corresponding to a binary "0." Phase angles $(\pm\theta)$ have a predetermined value, known in advance to be within very close tolerances, which may range from zero to $\pm 90°$. It will be appreciated that the particular code employed is merely illustrative: the binary signals need not be symmetrically disposed on either side of the carrier signal but may be variously arranged with respect thereto.

The preferred embodiment of the PM detector, generally designated with the numeral 12, includes two phase-locked loops 20, 30, a decision branch 40, and a signal conditioning branch 50. To simplify the drawing, the reference numeral adjacent to a conductor, or line, will also denote the signal existing on the line. Thus, for example, reference numeral 10 will denote both line 10 and the signal existing on line 10.

Phase-locked loop (PLL) 20 includes a phase-sensitive detector (PSD) 21, a low-pass filter (LPF) 22, a loop filter and amplifier (stabilization) network 23, a voltage-controlled oscillator (VCO) 24, and a phase-shifting network (PSN) 25 producing a phase shift of $(+\theta)$, all networks being cascaded around the loop as shown. Line 17 connecting LPF 22 and loop filter 23 is selectively opened or closed by a gate circuit 43.

Phase-locked loop 30 is arranged similarly to PLL 20 and includes a PSD 31, a LPF 32, the previously mentioned loop filter 23 and VCO 24, and a PSN 35 producing a phase shift of $(-\theta)$, all networks are cascaded around the loop as shown. Line 17*a* connecting loop filter 23 and LPF 32 is also selectively opened or closed by the gate circuit 43.

The decision branch 40 includes a PSD 41, followed by a LPF 42. Line 19 connects the LPF 42 to the input control terminal 47 of the gate circuit 43. The output signal conditioning branch 50 includes a filter network 51 followed by a utilization device 52, for example, a digital computer. Line 10 is connected to one input terminal of each of the phase-sensitive detectors 21, 31, and 41. Line 15 is connected to the other input terminal of PSD 41. Line 18 is connected to the input of filter network 51.

The function of VCO 24 is to generate a signal 15 the frequency of which is substantially equal to the known frequency of the incoming signals on line 10. Phase-locked loop 20 synchronizes (phase-locks) the phase of signals 10 and 15. The operation of a phase-sensitive detector (sometimes referred to as a multiplier, gate, or synchronous detector) is well known in the art. Essentially, it compares the relative phase between the two applied signals thereto and provides an output A.C. signal containing an average or D.C. component which is directly proportional (assuming linear operation) to the signals' phase difference relative to a steady state phase shift of 90°. The phase shifting networks 25, 35 may take on a variety of forms depending upon the nature of the voltage-controlled oscillator employed. For example, if VCO 24 is a multivibrator then the phase shifting networks 25 and 35 may also be multivibrators, each triggered by the leading and/or lagging edges of the rectangular wave 15. Whether VCO 24 be a sine or rectangular wave generator, it will be appreciated that it may also be internally arranged to provide three output signals 13, 14, and 15: signal 13 leading signal 15 by $(+\theta)$ and signal 14 lagging signal 15 by $(-\theta)$.

The specific arrangement of the loop filter and amplifier network 23 depends upon the desired loop bandwidth, response time, and transfer function. Conventionally, it is a D.C. (operational) amplifier with negative R.C. feedback networks. The gate circuit 43 may be an electro-mechanical or electronic switch. Preferably it is a transistorized switch or gate, acting as a single-pole-double-throw switch for selectively closing either its contacts 26, 27 or its contacts 27, 36 in correspondence with the level of signal 19 appearing on control terminal 47. The function of the low-pass filter 42 is to filter out the D.C. component 19 from the A.C. signal 18 in order to control the gate's switching action. If the employment of LPF 42 introduces, at the operating frequency, a time lag between signals 18 and 19, it is desirable to also insert low-pass filters 22, 32 between lines 16, 17 and 16*a*, 17*a*, respectively. Each of filters 22, 32 has a construction similar to filter 42 and produces substantially the same time delay T in their respective branches.

In operation, when the incoming signal 10 is a binary "1," i.e., $E(+\theta)$, signal 19 (as will be shown hereinafter) appearing on the gate's input terminal 47 is positive and, hence, the gate's terminals 26, 27 are closed and terminals 27, 36 are open. In accordance with conventional phase-locked-loop theory, under steady state operation signals 10 and 13 are shifted in phase by 90°, i.e., signal 13 is $E(\theta+90°)$, see FIG. 2. The D.C. component of the A.C. signal 16 is then zero and the loop is said to be "phase-locked." As the PSN 25 introduces a phase shift $(+\theta)$, it follows that signal 15 must be E(90°).

When the incoming signal 10 is a binary "0," i.e. $E(-\theta)$, the gate's terminals 26, 27 are open and terminals 27, 36 closed, because, as will appear hereinafter, the polarity of signal 19 is negative. Again, the action of phase-locked loop 30 makes signal 14 lead signal 10 by 90°, i.e., $E(-\theta+90°)$. Since the PSN 35 introduces a phase shift $(-\theta)$, it follows that signal 15 is E (90°). In sum, when signal 10 is either a binary "1" or a binary "0," signal 15 is E (90°). Signal 15 may be considered as a quadrature "reconstructed carrier" for it is shifted by 90° from the carrier signal E (0°). If the carrier signal at the transmitting end (which is usually not transmitted to save bandwidth) were to shift in phase from its reference position, signal 15 would also shift in phase by an equal amount. Therefore, it will be readily appreciated that the reconstructed signal 15 can be advantageously employed as a reference, or standard, signal for deciding whether the incoming bit is a binary "1" or a binary "0."

The phase-sensitive detector 41 receives the reference signal 15 and the incoming bit 10 substantially simultaneously and provides an A.C. signal 18 containing an average or D.C. component, the polarity of which is in correspondence with the state of the incoming bit: for example, plus and minus bits will produce respectively plus and minus D.C. components. In sum, when signal 10 is a binary "1," i.e. $E(+\theta)$, the D.C. component in signal 18 will be, for example, positive and, when signal 10 is a binary "0," i.e. $E(-\theta)$, then the D.C. component in signal 18 will be negative. Low-pass filter 42 will filter out the D.C. component contained in signal 18 and apply it to the gate's input terminal 47. Thus, as previously mentioned, gate 43 will close terminals 26, 27 when the incoming bit is a binary "1" and, inversely, close terminals 27, 36 when the incoming bit is a binary "0." The low-pass filter 51 will filter out the D.C. components contained in signal 18 and provide them to the utilization device 52.

If a shift in phase occurs in the incoming bits, A.C. signal 16 (or 16*a* depending upon which loop is energized) will contain a D.C. component. Loop filter 23 will filter out D.C. component 18 from signal 16 and apply it to the control terminal of the VCO 24 to shift the phase of signal 15 by an amount and in a direction as to maintain the relative phase relationships indicated on the drawing. The low-pass filters 22, 32, and 42, by introducing equal time delays T within their respective branches, assure the synchronous detection of signals 10 and 15.

Obviously, the preferred embodiment of this invention is subject to many modifications as will be readily apparent to a man skilled in the art. For example, phase-locked loops 20 and 30 may take on a variety of forms depending upon the transmitted signal-to-noise ratios, the desired loop stability, operating frequency, response time, etc. The incoming signals could be other than sine waves, for example, rectangular waves. It will also be understood that the PM detector in accordance with this invention is not limited to any particular phase code. The detector can operate on such known code types as the NRZ (non-return-to-zero), NRZI (non-return-to-zero-inverted), RZ (return-to-zero), etc.

Therefore it will be evident that the described embodiment is susceptible to various modifications in form and design within the scope of the invention as defined in the appended claims.

What is claimed is:

1. In a system for detecting an incoming coded electric signal whose phase assumes one of two prescribed values at a rate corresponding to the encoded intelligence; a first phase-locked loop discriminator including a first phase-sensitive detector and a signal generator, said discriminator detecting said incoming signal when its phase assumes one of said values and providing a first reference signal; a second phase-locked loop discriminator including a second phase-sensitive detector and said signal generator, said discriminator detecting said incoming signal when its phase assumes the other of said values and providing a second reference signal, said first and second reference signals having substantially the same phase; means including phase comparing means, said phase comparing means comparing the phase of said incoming coded signal relative to the phase of said reference signals and providing an output signal having a parameter which assumes one of two prescribed states in correspondence with said phase values.

2. The system of claim 1 and further including gating means responsive to said output signal to selectively render operative said first and second phase-locked loop discriminators in correspondence with said prescribed states.

3. In a system for processing an incoming coded electric signal whose phase selectively assumes a first and a second value at a rate corresponding to the encoded intelligence; a first phase-locked loop descriminator to process said incoming signal when its phase assumes said first value, said discriminator including a first phase-sensitive detector and signal generating means, said signal generating means including means for producing a first standard signal and a signal leading said standard signal by an amount substantially equal to said first value; a second phase-locked loop discriminator to process said incoming signal when its phase assumes said second value, said second discriminator including a second phase-sensitive detector and said signal generating means, said signal generating means including means for producing a second standard signal and a signal lagging said second standard signal by said second value; and means including phase comparing means to compare the phase of said incoming signal with the phase of said standard signals and to provide an output coded signal having a parameter which varies in correspondence with said first and said second phase values.

4. The system of claim 3 and further including gating means responsive to said output coded signal for selectively rendering operative said first and second phase-locked loops in correspondence with said first and said second phase values.

5. The system of claim 4 wherein said first and said second standard signals have substantially the same phase.

6. In a system for processing a coded phase modulated wave consisting of binary ONE and ZERO signals having opposite polarity phase angles about a center value; a first phase-locked loop discriminator to process said ONE signals, said discriminator including a first phase-sensitive detector and signal generating means, said signal generating means producing a reference signal; a second phase-locked loop discriminator to process said ZERO signals, said second discriminator including a second phase-sensitive detector and said signal generating means; and means including phase comparing means, said phase comparing means comparing the phase of said ONE and ZERO signals with the phase of said reference signal and providing an output coded signal.

7. The system of claim 6 and further including switching means responsive to said output signal for selectively rendering operative said first and said second phase-locked loop discriminators.

8. In a system for processing a coded phase modulated wave consisting of ONE and ZERO signals, the phase of said ONE signals having a first value and the phase of said ZERO signals having a second value; a first phase-locked loop discriminator to process said ONE signals, said discriminator including a first phase sensitive detector and signal generating means, said generating means including means for producing a standard signal having a reference phase angle and a first signal leading said standard signal by an amount substantially equal to said first value; a second phase-locked loop discriminator to process said ZERO signals, said second discriminator including a second phase sensitive detector and said signal generating means, said generating means further producing a second signal lagging said standard signal by said second value; and means including a third phase sensitive detector said third phase sensitive detector comparing the phase between said ONE and ZERO signals and said standard signal and providing an output signal having a parameter which assumes at least one of two states in correspondence with said first and second phase values.

9. The system of claim 8 and further including switching means responsive to said output signal for selectively rendering operative said first and said second phase-locked loop discriminators in correspondence with the value of said output signal.

10. In a system for processing a coded phase modulated wave consisting of ONE and ZERO signals having opposite polarity phase angles about a center value; a first phase-locked loop, operatively connected to process said ONE signals, including a phase-sensitive detector, signal generating means producing a first reference signal and means coupled between said phase sensitive detector and said signal generating means for shifting the phase of said first reference signal by an amount substantially equal to the phase of said ONE signals; a second phase-locked loop, operatively connected to process said ZERO signals, including a second phase-sensitive detector, said signal generating means producing a second reference signal, and means coupled between said signal generating means and said second phase-sensitive detector for shifting the phase of said second reference signal by an amount substantially equal to the phase of said ZERO signals, said first and second reference signals being in substantial phase quadrature with said center value; and a third phase sensitive detector arranged to compare the phase of said ONE and ZERO signals with the phase of said reference signals and to provide an output signal having a parameter which varies in correspondence with said ONE and ZERO signals.

11. The system of claim 10 and further including switching means responsive to said output signal for selectively rendering operative said first and said second phase-locked loops in accordance with the value of said output signal.

12. In a system for detecting an incoming coded, phase-modulated wave consisting of ONE and ZERO bits; first detecting means to detect said ONE bits and to provide a first reference signal, said first means including a first phase sensitive detector, a loop filter, a voltage controlled oscillator, and a first phase shifting network all cascaded to form a first loop;

second detecting means to detect said ZERO bits and to provide a second reference signal, said second means including a second phase sensitive detector, said loop filter, said voltage controlled oscillator, and a second phase shifting network all cascaded to form a second loop; said first and said second reference signals having substantially the same phase angle;

phase comparing means to compare the phases of said bits relative to the phase of said reference signals and to provide an output signal having a parameter which varies in correspondence with said ONE and ZERO bits; switching means responsive to said output signal for selectively rendering operative said first and second detecting means in dependence upon the value of said parameter; and, filtering means coupled to said phase comparing means to transform said output signal into a coded, amplitude-modulated wave.

13. The system of claim 12 wherein said phase comparing means is a third phase sensitive detector.

References Cited by the Examiner

UNITED STATES PATENTS

| | | | |
|---|---|---|---|
| 2,984,701 | 5/61 | Barry | 178—66 |
| 3,008,124 | 11/61 | Warnock | 340—170 |
| 3,008,125 | 11/61 | Zadoff et al. | 178—66 |
| 3,028,487 | 4/62 | Losee | 325—349 |
| 3,109,143 | 10/63 | Clutch | 325—320 |

NEIL C. READ, *Primary Examiner.*